United States Patent
Adachi et al.

(10) Patent No.: US 10,882,573 B2
(45) Date of Patent: Jan. 5, 2021

(54) TOWING DEVICE FOR AUTOMATIC GUIDED VEHICLE, AND AUTOMATIC GUIDED VEHICLE PROVIDED WITH THE SAME

(71) Applicants: AICHIKIKAI TECHNOSYSTEM CO., LTD., Nagoya (JP); HONDA MOTOR, CO., LTD., Tokyo (JP)

(72) Inventors: Ryuji Adachi, Nagoya (JP); Takayuki Kaneko, Tokyo (JP)

(73) Assignees: AICHIKIKAI TECHNOSYSTEM CO., LTD., Nagoya (JP); HONDA MOTOR CO., LTD., Tokyo (JP)

( * ) Notice: Subject to any disclaimer, the term of this patent is extended or adjusted under 35 U.S.C. 154(b) by 222 days.

(21) Appl. No.: 16/314,081

(22) PCT Filed: Jun. 28, 2017

(86) PCT No.: PCT/JP2017/023658
§ 371 (c)(1),
(2) Date: Dec. 28, 2018

(87) PCT Pub. No.: WO2018/012284
PCT Pub. Date: Jan. 18, 2018

(65) Prior Publication Data
US 2019/0168829 A1    Jun. 6, 2019

(30) Foreign Application Priority Data
Jul. 14, 2016    (JP) .................... 2016-139080

(51) Int. Cl.
*B62D 53/08*    (2006.01)
*B61B 13/00*    (2006.01)
(Continued)

(52) U.S. Cl.
CPC ............. *B62D 53/08* (2013.01); *B60D 1/015* (2013.01); *B61B 13/00* (2013.01); *B62D 59/04* (2013.01);
(Continued)

(58) Field of Classification Search
CPC ........ B62D 53/08; B62D 59/04; B62D 61/04; B62D 61/02; B62D 2001/001;
(Continued)

(56) References Cited

U.S. PATENT DOCUMENTS 3,414,072 A * 12/1968 Hodges, Jr. ............. B62D 5/09
180/24
3,637,236 A *  1/1972 Shimoji ................ B62D 13/00
280/419

(Continued)

FOREIGN PATENT DOCUMENTS

| JP | H02-13875 U | 1/1990 |
| JP | 2001-278134 A | 10/2001 |
| JP | 2004-299615 A | 10/2004 |

OTHER PUBLICATIONS

International Search Report dated Aug. 8, 2017 for corresponding foreign Application No. PCT/JP2017/023658, p. 1.

*Primary Examiner* — Ruth Ilan
*Assistant Examiner* — Harold Eric Pahlck, III
(74) *Attorney, Agent, or Firm* — United IP Counselors, LLC

(57) ABSTRACT

A towing device for an automatic guided vehicle that tows a carriage is disclosed. The towing device includes a connecting member, one end of which is connected to the automatic guided vehicle, and a hook member connected to the other end of the connecting member. One end of the connecting member is swivelably connected to the automatic guided vehicle. A swivel shaft axis line of the con-
(Continued)

FORWARD RUNNING DIRECTION necting member and a swivel shaft axis line of a drive unit of the automatic guided vehicle are configured to be coaxial.

4 Claims, 13 Drawing Sheets

(51) Int. Cl.
*B60D 1/01* (2006.01)
*B62D 59/04* (2006.01)
*B62D 61/02* (2006.01)
*B60D 1/00* (2006.01)
*B62D 5/00* (2006.01)
*B62B 5/00* (2006.01)

(52) U.S. Cl.
CPC ........ *B62D 61/02* (2013.01); *B60D 2001/005* (2013.01); *B62B 5/0079* (2013.01)

(58) Field of Classification Search
CPC .. B60D 1/015; B60D 2001/005; B60D 1/481; B61B 13/00; G05D 1/0088; B62B 5/0079
See application file for complete search history.

(56) References Cited

U.S. PATENT DOCUMENTS

| | | | | |
|---|---|---|---|---|
| 5,033,763 A * | 7/1991 | Daenens | ................ | B62D 53/00 280/426 |
| 5,109,940 A * | 5/1992 | Yardley | ................... | B60D 1/06 180/168 |
| 5,326,123 A * | 7/1994 | Guest | ...................... | B60D 1/36 280/433 |
| 5,559,696 A * | 9/1996 | Borenstein | ............. | G01C 21/12 701/23 |
| 6,276,469 B1 * | 8/2001 | Smith | .................... | B62D 51/04 180/125 |
| 6,758,291 B1 * | 7/2004 | Koch | .................... | B60D 1/246 180/11 |
| 7,275,907 B1 * | 10/2007 | Reichard | ............... | B60P 3/1033 114/344 |
| 7,350,613 B2 * | 4/2008 | Dehne | ................... | B62D 65/18 180/167 |
| 7,451,841 B2 * | 11/2008 | Nelson | .................. | B62D 51/04 180/13 |
| 7,905,304 B2 * | 3/2011 | Adachi | .................. | B66F 9/063 180/12 |
| 8,041,455 B2 * | 10/2011 | Thorne | ................ | G05D 1/0272 700/245 |
| 9,371,060 B2 * | 6/2016 | Smith | .................... | B62D 59/04 |
| 9,988,114 B1 * | 6/2018 | Freakes | ................ | B62K 1/00 |
| 10,668,617 B2 * | 6/2020 | Jacobsen | ............. | G05D 1/0231 |
| 2004/0093650 A1 * | 5/2004 | Martins | .................. | B25J 5/007 180/167 |
| 2007/0151776 A1 * | 7/2007 | Hart | ........................ | B60S 9/215 180/11 |
| 2012/0221186 A1 * | 8/2012 | Bourquin | ............... | B60B 39/00 701/23 |
| 2013/0292199 A1 * | 11/2013 | Blanton | ................ | B62D 59/04 180/291 |
| 2014/0202778 A1 * | 7/2014 | Barrett | .................... | B60S 9/215 180/12 |
| 2019/0299729 A1 * | 10/2019 | Sokuza | .................. | B61G 1/28 |

* cited by examiner

TOWING DEVICE FOR AUTOMATIC GUIDED VEHICLE, AND AUTOMATIC GUIDED VEHICLE PROVIDED WITH THE SAME

CROSS-REFERENCE TO RELATED APPLICATIONS

This application is the U.S. National Phase of PCT International Application No. PCT/JP2017/023658, filed Jun. 28, 2017, which claims priority to Japanese Patent Application No. 2016-139080, filed Jul. 14, 2016. The contents of both of those applications are incorporated by reference herein in their entirety.

TECHNICAL FIELD

The present disclosure relates to a towing device for an automatic guided vehicle that includes a pair of drive wheels and an axle supporting the pair of drive wheels and attached to the automatic guided vehicle configured to be swivelable with respect to a vehicle body and capable of towing a carriage, and an automatic guided vehicle provided with the same.

BACKGROUND

Japanese Unexamined Utility Model Application Publication No. H02-13875 (Patent Document 1) discloses a towing device for an automatic guided vehicle including a connecting member for connecting an automatic guided vehicle configured such that a center portion of an axle of front wheels serving as drive wheels which are driven by a motor is provided so as to be swivelable relative to a vehicle body and a center portion of an axle of rear wheels is provided so as to be swivelable relative to the vehicle body, and connecting a carriage in which a center portion of an axle of a front wheel and a rear wheel is provided to be swivelable relative to the vehicle body.

In the towing device for an automatic guided vehicle described in the above-mentioned publication, one end of the connecting member is connected to the automatic guided vehicle so as to be able to swivel about the swivel shaft of the rear wheel of the automatic guided vehicle while the other end of the connecting member is connected to the carriage so as to be able to swivel about the swivel shaft of the front wheel of the carriage, whereby when the automatic guided vehicle travels on a curved road, the axles of the rear wheels of the automatic guided vehicle and the axles of the front wheels of the carriage are steered so as to face the center of the curved traveling path; thus allowing the carriage to travel with substantially the same trajectory as that of the automatic guided vehicle.

BRIEF SUMMARY

When a carriage is towed by an automatic guided vehicle, the driving force of the drive wheels of the automatic guided vehicle acts as the towing force on a connecting portion (hereinafter referred to as "towing point") between the automatic guided vehicle and the connecting member. However, in the towing device for an automatic guided vehicle described in the above-mentioned publication, the swivel center of the drive wheels of the automatic guided vehicle is different from the towing point, and therefore a rotational moment is generated in a direction that hinders the swivel of the drive wheels due to the towing force acting on the towing point. Thus, in the towing device for an automatic guided vehicle described in the above-mentioned publication, there is still room for improvement in terms of the steerability of the automatic guided vehicle.

The present advancement has been made in view of the above, and an object of the present advancement is to provide a technique capable of preventing a decline in steerability when an automatic guided vehicle tows a carriage.

In order to achieve the above object, the towing device for an automatic guided vehicle of the present advancement and an automatic guided vehicle provided with the same adopt the following means.

In accordance with a preferred embodiment of a towing device for an automatic guided vehicle according to the present advancement, a towing device for an automatic guided vehicle is configured to be capable of connecting a carriage and an automatic guided vehicle having drive wheels swivelably supported on a vehicle body. The towing device for an automatic guided vehicle includes a connecting member having one end that is connected to the automatic guided vehicle swivelably around the swivel shaft of the drive wheels and the other end that is connected to a carriage. Here, in addition to the aspect in which the other end of the connecting member is directly connected to the carriage exemplifying as the aspect in which "the other end is connected to the carriage" of the present advancement, preferably, an aspect is included wherein, for example, a hook member or the like is connected to the other end of the connecting member, and thereafter, indirectly connects the carriage via the hook member.

According to the present advancement, the connecting member is connected to the automatic guided vehicle so as to be swivelable about the swivel shaft of the drive wheel. That is, the swivel center of the drive wheels and the swivel center of the connecting member have the same configuration. Therefore, there is no generation of a rotational moment in the direction hindering the swivel of the drive wheels caused by the towing force when the automatic guided vehicle travels on a curved road. With this configuration, it is possible to prevent a decline in the steerability of the automatic guided vehicle when towing a carriage.

In accordance with a preferred embodiment of an automatic guided vehicle according to the present advancement, there is provided an automatic guided vehicle including a vehicle body, a drive unit that have drive wheels swivelably supported with respect to the vehicle body, and a caster provided so as to freely swivel with respect to the vehicle body; the automatic guided vehicle being configured to be capable of towing a carriage by means of the towing device for an automatic guided vehicle according to any one of the above described aspects of the present advancement.

In accordance with a preferred embodiment of the automatic guided vehicle according to the present advancement, the operation of towing a carriage using the towing device of the present advancement according to any one of the above described aspects enables achieving the same effect as the effect of the towing device of the automatic guided vehicle of the present advancement, for example, to prevent a decline in the steerability of an automatic guided vehicle when towing a carriage. Thus, the reliability of the automatic guided vehicle can be improved.

In accordance with a further embodiment of the automatic guided vehicle according to the present advancement, the drive wheels have a swivel shaft having an axis line extending in a vertical direction and intersecting an axle of the drive wheels.

According to the present exemplary embodiment, a restoring torque in a direction of reversing the swivel of the drive wheels is not generated when swiveling the drive wheels, whereby the steerability of the drive wheels can be improved.

In accordance with a further embodiment of the automatic guided vehicle according to the present advancement, the drive wheels are disposed on the rear side in the traveling direction of the automatic guided vehicle and a caster is disposed on the front side in the traveling direction.

According to the present exemplary embodiment, the drive wheels are disposed on the rear side in the traveling direction of the automatic guided vehicle, that is, on the side closer to the carriage, and therefore the connecting member can be made compact. As a result, the amount of lateral swinging of the carriage via the connecting member can be kept small.

According to the present advancement, it is possible to provide a technique capable of preventing a decline in the steerability of the automatic guided vehicle when towing a carriage.

DETAILED DESCRIPTION

Next, best modes for carrying out the present advancement will now be described with reference to exemplary embodiments, given by way of example.

Exemplary Embodiments

Figure 1:
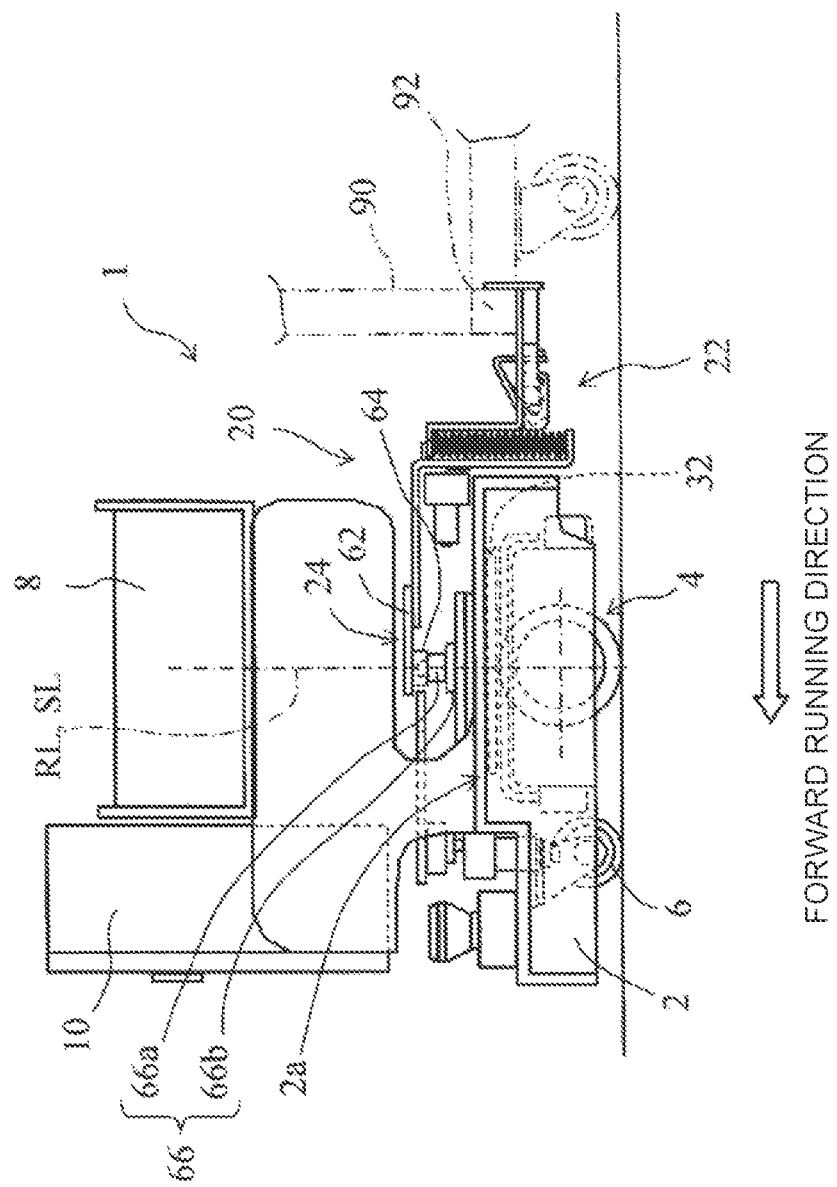
FIG. 1 is a side view of an automatic guided vehicle 1 mounted with a towing device 20 according to an exemplary embodiment of the present advancement as viewed from the side.
Figure 2:
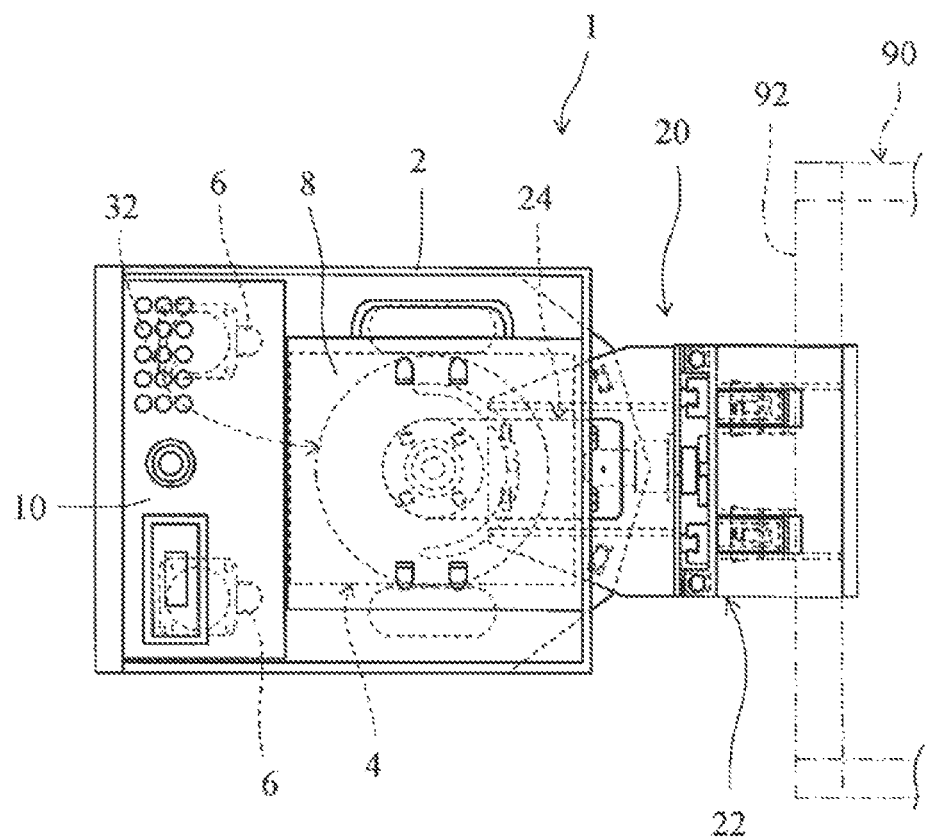
FIG. 2 is a plan view of the automatic guided vehicle 1 mounted with the towing device 20 according to an exemplary embodiment of the present advancement as viewed from above.

As shown in FIGS. 1 and 2, an automatic guided vehicle 1 according to the present embodiment includes a vehicle body 2, a drive unit 4 that is disposed so as to be swivelable on the vehicle body 2, a pair of front side casters 6 and 6 provided at two positions, left and right, on the front side in the forward travelling direction, a battery 8, and a control device 10 for controlling the entire automatic guided vehicle 1. The automatic guided vehicle 1 is configured to tow a carriage 90 by means of a towing device 20 according to the present embodiment. It is to be noted that in the present embodiment, for convenience sake, the front side in the traveling direction when the automatic guided vehicle 1 travels forward is defined as the "front side", and the rear side is defined as the "rear side" in the traveling direction. Further, the right side towards the traveling direction when the automatic guided vehicle 1 travels forward is defined as the "right side" and the left side in the traveling direction is define as the "left side".

Figure 3:
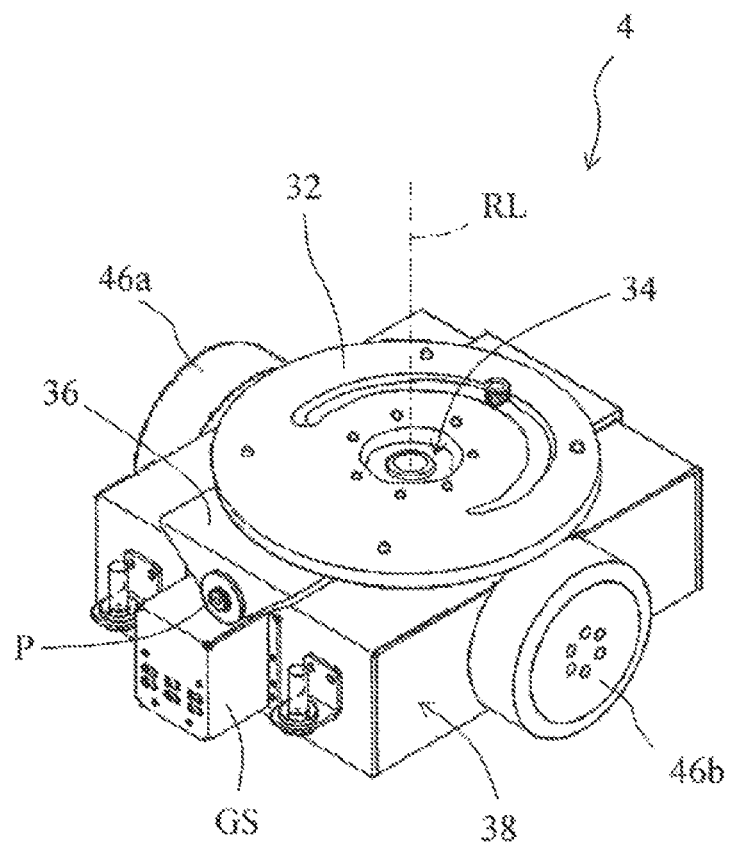
FIG. 3 is a perspective view of an outline of a configuration of a drive unit 4.
Figure 4:
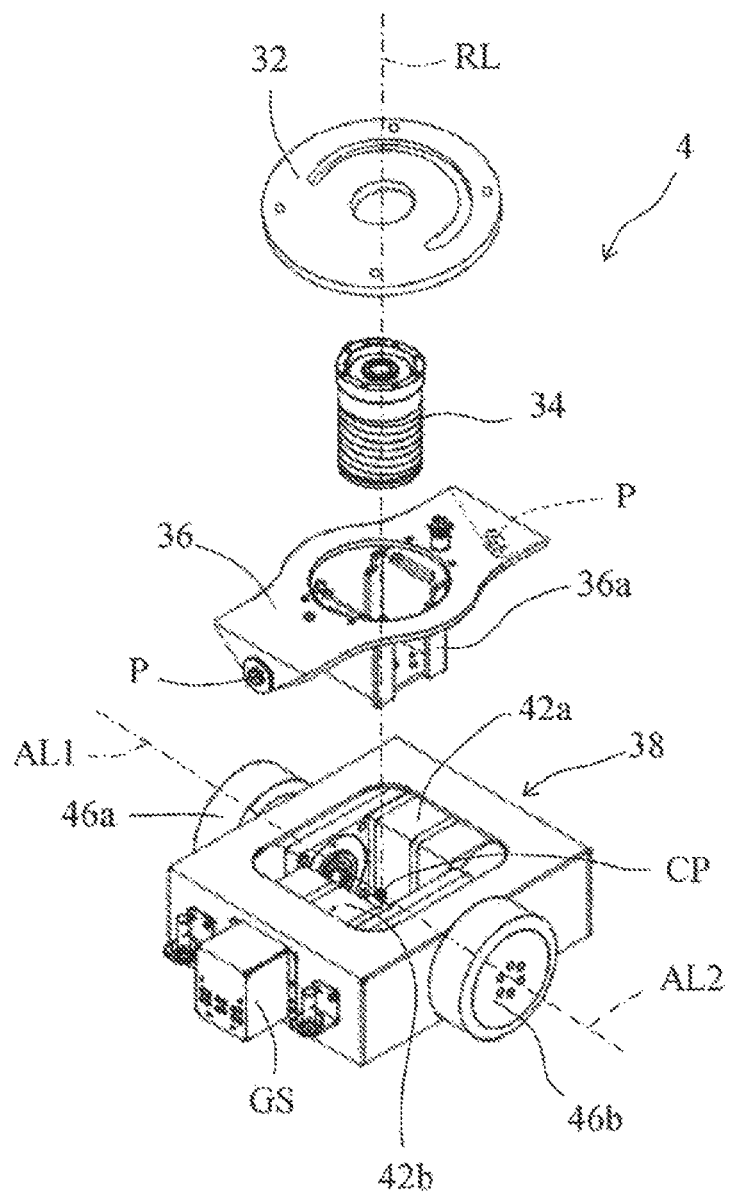
FIG. 4 is an exploded perspective view of the drive unit 4.

As shown in FIGS. 3 and 4, the drive unit 4 includes a top plate 32, a swivel shaft mechanism 34, a swing supporting plate 36, and a unit main body 38. The top plate 32 is fastened to the inner surface of a base portion 2a of the vehicle body 2 so that the drive unit 4 is attached to the automatic guided vehicle 1 as shown in FIG. 1. Note that the drive unit 4 is disposed at a position on the rear side in the forward traveling direction of the automatic guided vehicle 1. That is, right and left drive wheels 46a and 46b of the drive unit 4, to be described later, constitute the rear wheels of the automatic guided vehicle 1.

As shown in FIG. 4, one axial end of the swivel shaft mechanism 34 is fastened to the top plate 32 while the other axial end thereof is fastened to the bottom surface of a holder portion 36a of the swing supporting plate 36, thereby coupling the top plate 32 and the swing supporting plate 36 so as to be relatively rotatable to each other. Note that the swivel shaft mechanism 34 is configured so that a swivel shaft axis line RL is oriented in the vertical direction when the drive unit 4 is installed in the automatic guided vehicle 1, and that the swivel shaft axis line RL also passes through an intersection CP of respective axis lines AL1 and AL2 of right and left axles 44a and 44b, which will be described later. That is, the swivel shaft mechanism 34 is configured to intersect the central portion CP between the right and left drive wheels 46a and 46b (refer to FIG. 4). In other words, the swivel shaft mechanism 34 is configured to swivelably support the drive unit 4 around the center portion CP between the right and left drive wheels 46a and 46b. Here, the aspect in which the swivel shaft mechanism 34 is configured so that the swivel shaft axis line RL is oriented in the vertical direction when the drive unit 4 is installed in the automatic guided vehicle 1 is an example of an embodiment corresponding to the embodiment of the present advancement in which "the swivel shaft of the drive wheels is configured such that the axis line extends in the vertical direction".

As shown in FIGS. 3 and 4, the swing supporting plate 36 is configured to pivotally support the front and rear end faces of the unit main body 38 via a swinging pin P. That is, the swing supporting plate 36 supports the unit main body 38 in a state enabling the unit main body 38 to swing around the swinging pin P as a center.

Figure 5:
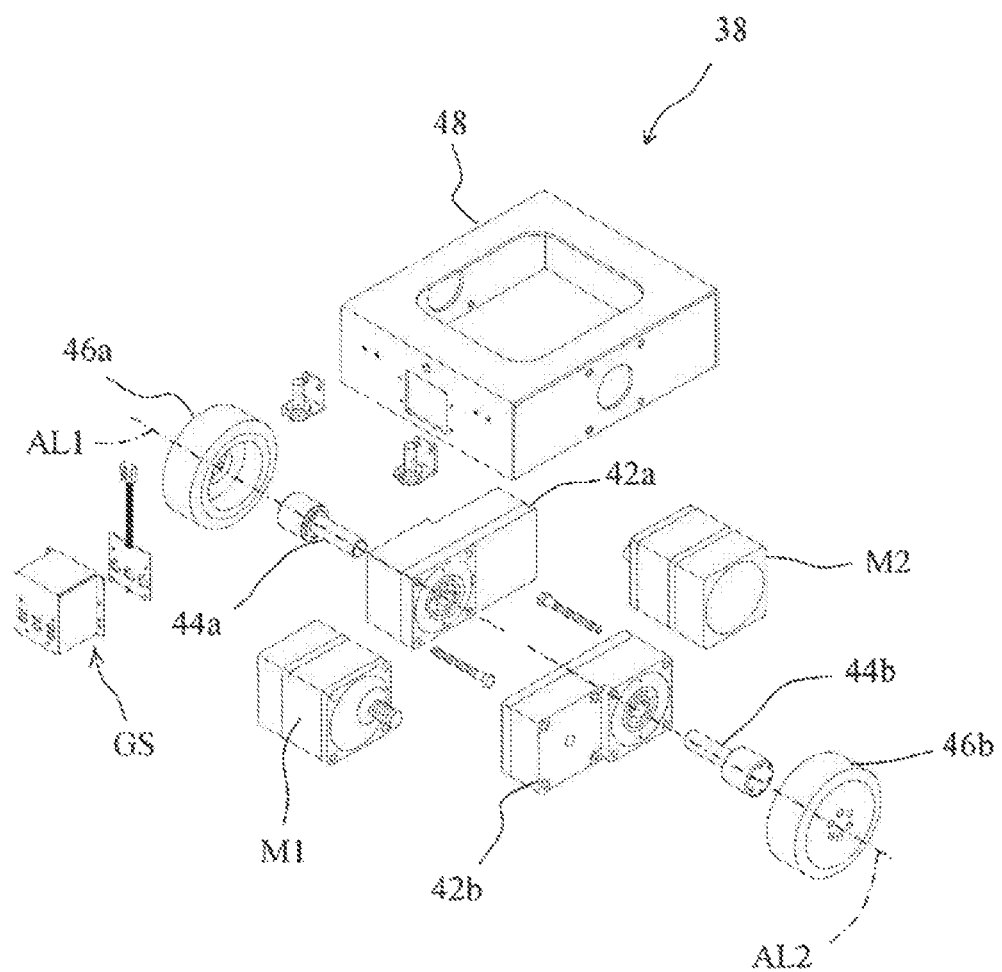
FIG. 5 is an exploded perspective view of a unit main body 38.
Figure 6:
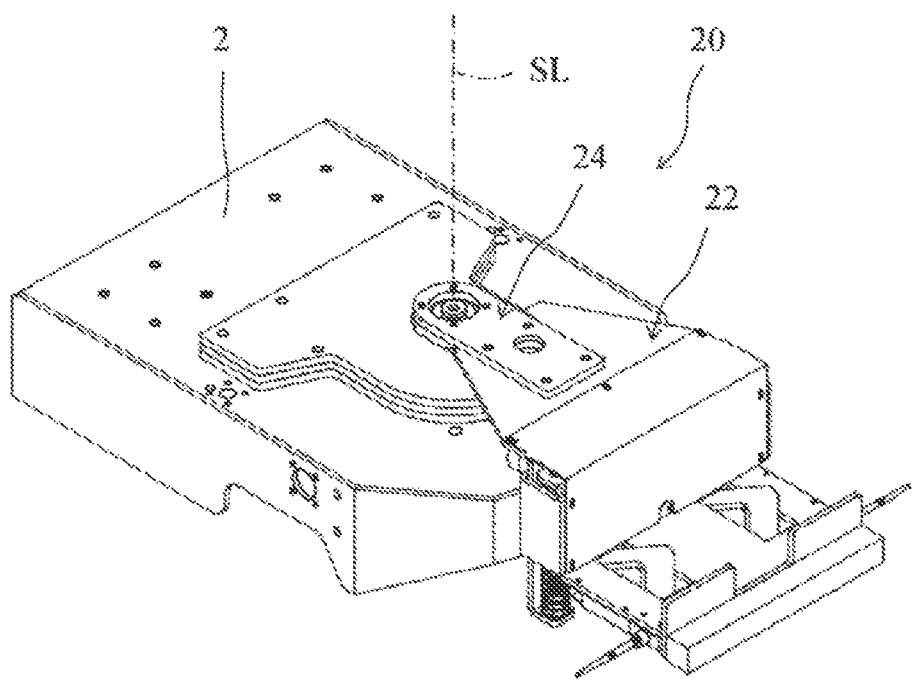
FIG. 6 is a perspective view illustrating an appearance of the towing device 20 according to an exemplary embodiment of the present advancement.

As shown in FIG. 5, the unit main body 38 includes: a pair of motors M1 and M2; a pair of gear boxes 42a and 42b connected to the motors M1 and M2, respectively; the right drive wheels 46a and the left drive wheels 46b connected to the gear boxes 42a and 42b via the right axle 44a and the left axle 44b, respectively; a frame 48 for accommodating the motors M1 and M2 and the gear boxes 42a and 42b; and a guide sensor GS attached to the frame 48. Note that the right axle 44a and the left axle 44b are arranged so that the axis lines AL1 and AL2 of the respective axles 44a and 44b are coaxial as shown in FIG. 5.

Figure 7:
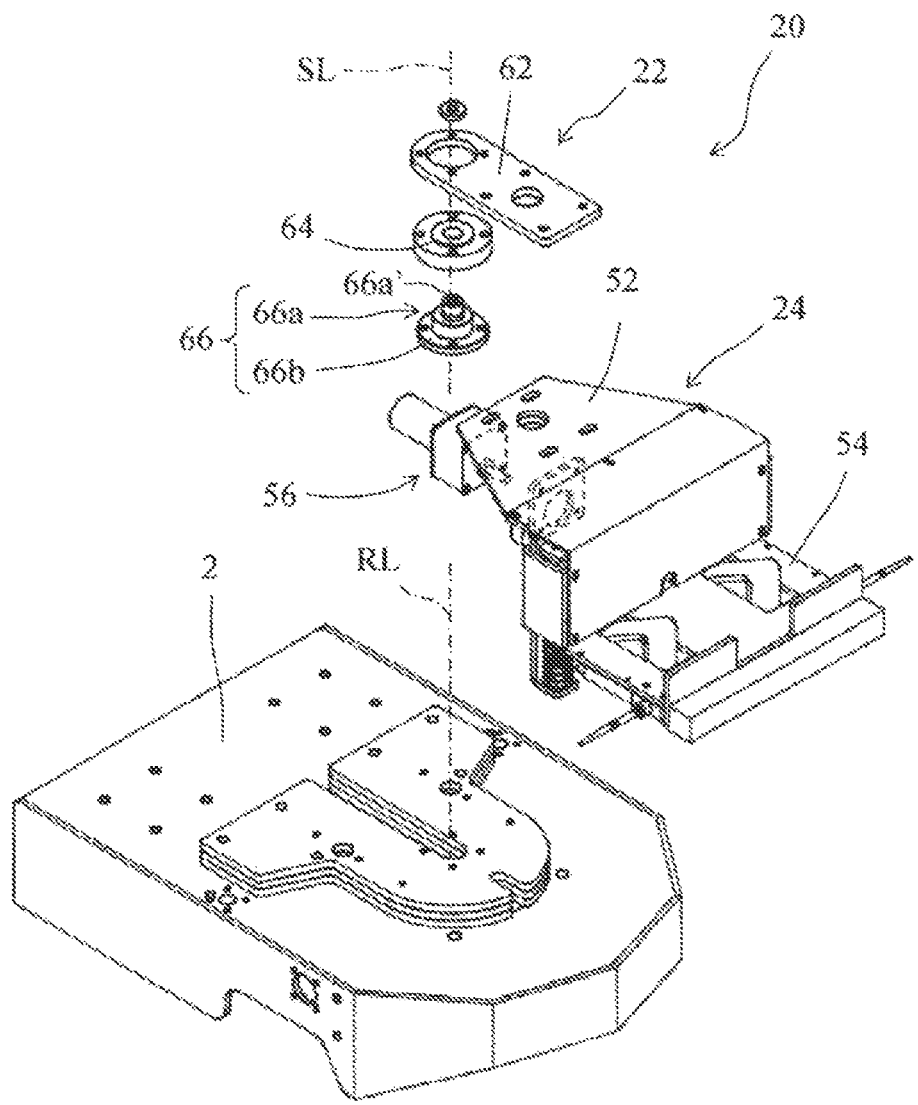
FIG. 7 is an exploded perspective view of the towing device 20 according to an exemplary embodiment of the present advancement.
Figure 8:
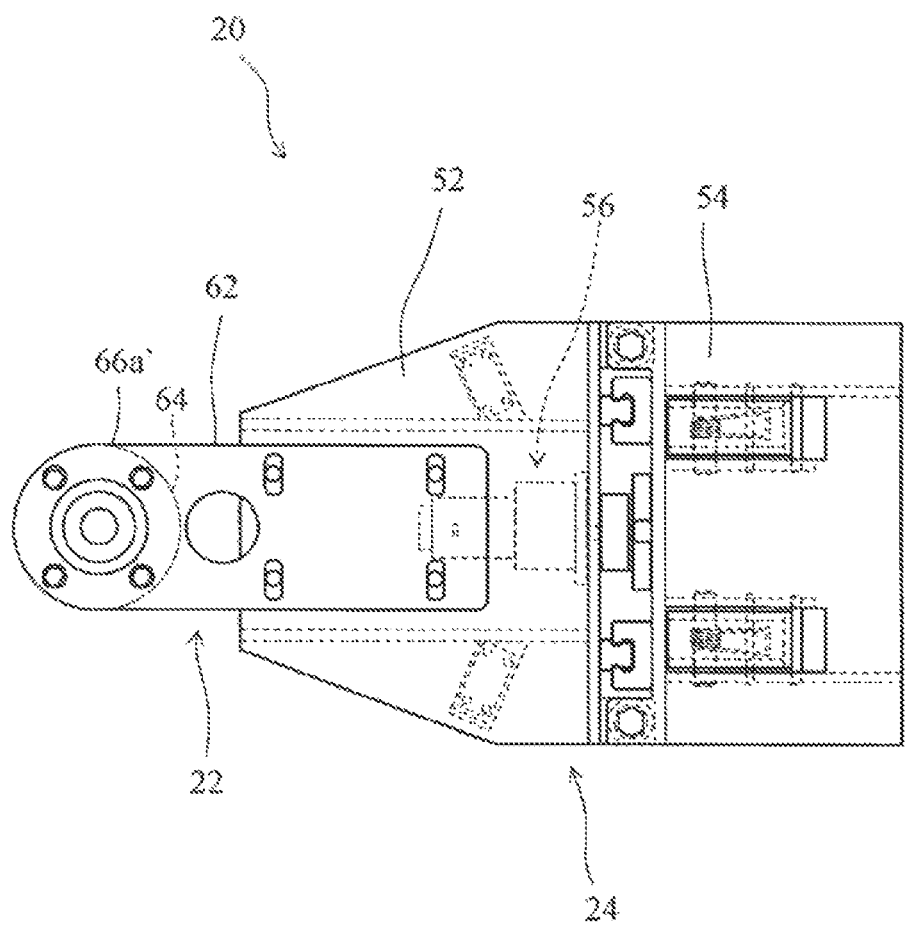
FIG. 8 is a plan view of the towing device 20 according to an exemplary embodiment of the present advancement as viewed from above.
Figure 9:
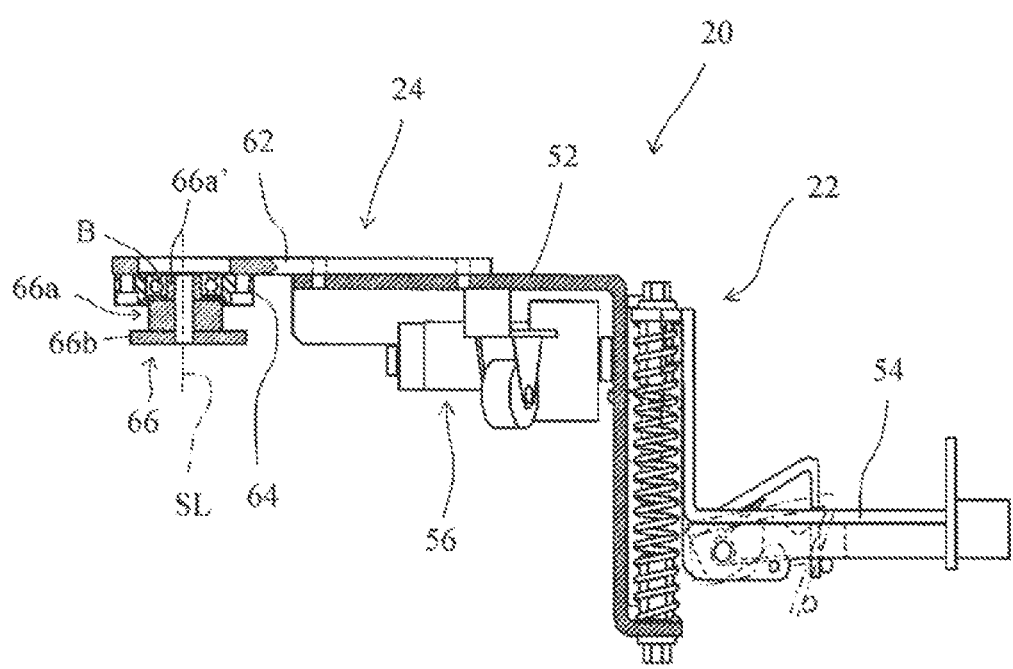
FIG. 9 is a cross sectional side view illustrating a part of the towing device 20 according to an exemplary embodiment of the present advancement as viewed from the side.

As shown in FIGS. 6 to 9, the towing device 20 according to the present embodiment includes a hook member 22 and a connecting member 24 for connecting the hook member 22 to the automatic guided vehicle 1. As shown in FIGS. 7 and 9, the hook member 22 includes a swing frame 52, a tow hook 54 attached to the swing frame 52, and a drive mechanism 56 for driving the tow hook 54 up and down vertically with respect to the swing frame 52. The tow hook 54 is engaged with a frame 92 of the carriage 90.

As shown in FIGS. 7 and 9, the connecting member 24 includes a slide plate 62, a bearing holder 64, and a swivel shaft 66. The slide plate 62 is formed as a plate member having a substantially rectangular shape in plan view, and one end portion thereof in the longitudinal direction is fastened to the swing frame 52 of the hook member 22 while the other end portion thereof in the longitudinal direction is fastened to the bearing holder 64. As shown in FIG. 7, the bearing holder 64 has a substantially disc-like outer shape, and as shown in FIG. 9, is configured to be able to house a ball bearing B therein.

As shown in FIGS. 7 and 9, the swivel shaft 66 has a stepped shaft portion 66a and a flange portion 66b. A small diameter shaft portion 66a' of the stepped shaft portion 66a is fitted to the inner peripheral surface (inner hole of the inner race) of the ball bearing B. Furthermore, the flange portion 66b is fastened to the base portion 2a of the vehicle body 2 of the automatic guided vehicle 1 as shown in FIG. 1. Note that, as shown in FIG. 7, the swivel shaft 66 is attached to the base portion 2a so that a swivel shaft axis line SL of the swivel shaft 66 and a swivel shaft axis line RL of the swivel shaft mechanism 34 are coaxial. That is, the drive unit 4 and the connecting member 24 are configured to have the same swivel shaft axis line.

The connecting member 24 connects one end of the towing device 20 thus configured to the automatic guided vehicle 1 thereby enabling the automatic guided vehicle 1 to swivel (swing) about the swivel shaft axis lines SL and RL, and the hook member 22, which is fastened to the connecting member 24, engages the other end of the towing device 20 to the frame 92 of the carriage 90, whereby the towing of the carriage 90 having flexible steerablity with respect to the automatic guided vehicle 1 is realized.

Figure 10:
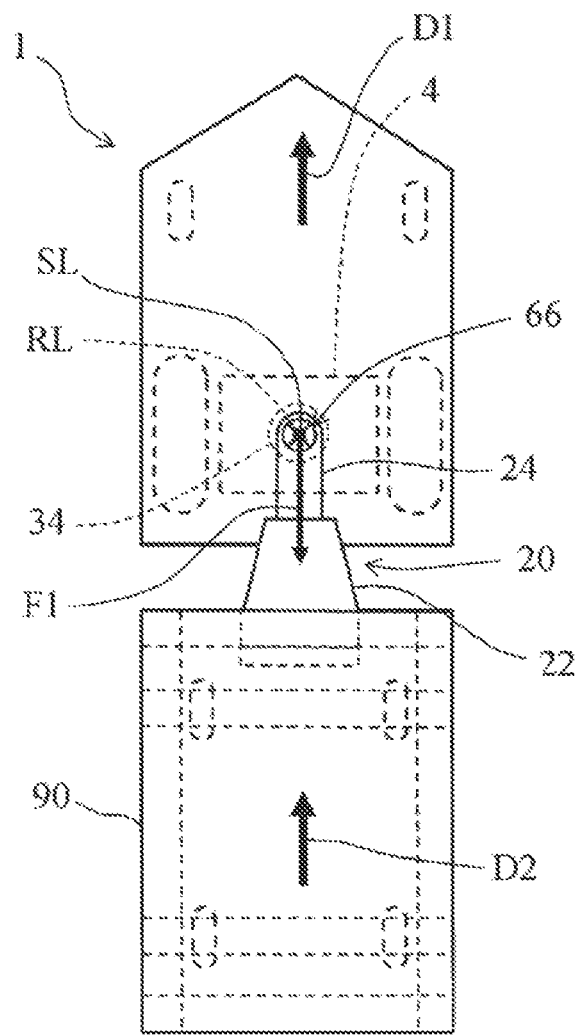
FIG. 10 is an explanatory diagram illustrating a state in which the automatic guided vehicle 1 mounted with the towing device 20 according to an exemplary embodiment of the present advancement tows a carriage 90 while travelling straight.

The operation of the automatic guided vehicle 1 that is equipped with the towing device 20 configured in this manner and that involves swivel while towing the carriage 90 will be described next. When the automatic guided vehicle 1 tows the carriage 90 via the towing device 20, a towing force acts on the swivel shaft 66 of the connecting member 24 as shown in FIG. 10. Specifically, a force F1 (to the automatic guided vehicle 1, the running resistance force F1 hinders its traveling in the traveling direction D1) which is necessary for moving the carriage 90 in a traveling direction D2 (the same direction as a traveling direction D1 of the automatic guided vehicle 1) is exerted.

Figure 11:
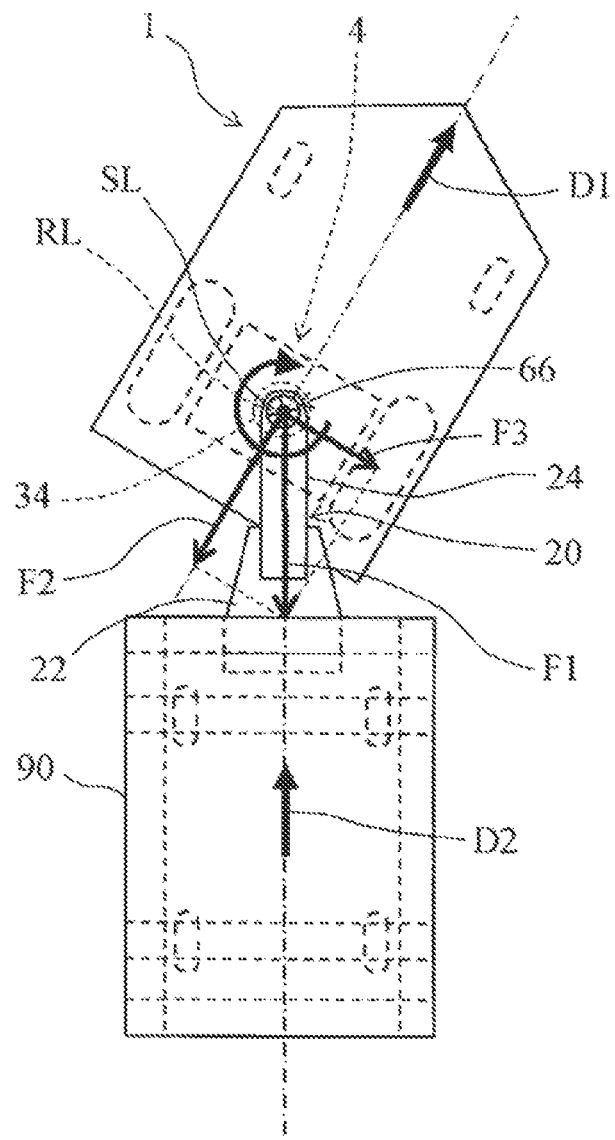
FIG. 11 is an explanatory diagram illustrating a state in which the automatic guided vehicle 1 mounted with the towing device 20 according to an exemplary embodiment of the present advancement tows the carriage 90 while running and swiveling.

When the automatic guided vehicle 1 swivels, as shown in FIG. 11, the traveling direction D1 of the automatic guided vehicle 1 and the traveling direction D2 of the carriage 90 will have a predetermined angle. As a result, a force F2 and a force F3, which are the component forces of the force F1 (running resistance force F1), act on the swivel shaft 66. It is to be noted that the force F2 is a force in a direction opposite to the traveling direction D1, and the force F3 is a force orthogonal to the traveling direction D1 and in a direction toward the center of the swivel traveling path.

Figure 12:
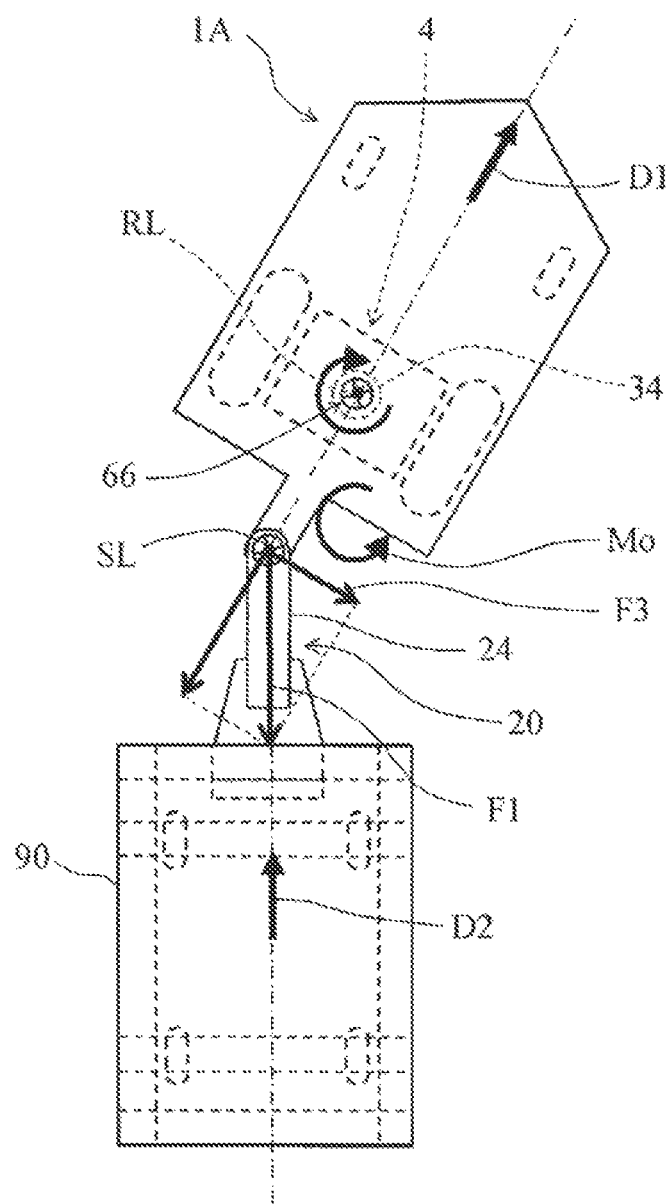
FIG. 12 is an explanatory diagram illustrating a state in which an automatic guided vehicle 1A, in a comparative example, tows the carriage 90 while running and swiveling when a swivel shaft axis line RL of the drive unit 4 and a swivel shaft axis line SL of the towing device 20 are not coaxial.

Here, in the case where the swivel shaft axis line SL of the swivel shaft 66 and the swivel shaft axis line RL of the drive unit 4 are offset from each other as illustrated in a conventional automatic guided vehicle 1A shown in FIG. 12, that is, when the swivel shaft axis line SL of the swivel shaft 66 and the swivel shaft axis line RL of the swivel shaft mechanism 34 are not coaxial, a rotational moment Mo resulting from the force F3, which is the component force of the force F1, occurs around the swivel shaft axis line RL of the drive unit 4. The rotational moment Mo is generated in a direction that hinders the swivel of the drive unit 4 upon towing.

However, in the towing device 20 according to the exemplary embodiment of the present advancement, as shown in FIG. 11, the swivel shaft axis line SL of the swivel shaft 66 and the swivel shaft axis line RL of the drive unit 4 are disposed so as to be coaxial, and therefore the force F3 only acts in the direction of laterally shifting the drive unit 4 without becoming such a force as to hinder the swivel of the drive unit 4 upon towing. As a result, the steerability of the automatic guided vehicle 1 does not decline.

According to the towing device 20 of the present exemplary embodiment described above, with this configuration in which the swivel shaft axis line SL of the swivel shaft 66 and the swivel shaft axis line RL of the drive unit 4 are arranged so as to be coaxial, there is no occurrence of a force that hinders the swivel of the drive unit 4 during towing. As a result, it is possible to prevent a decline in the steerability of the automatic guided vehicle 1.

In addition, according to the towing device 20 of the present exemplary embodiment, with this configuration in which the swivel shaft axis line RL passes through the intersection CP of the respective axis lines AL1 and AL2 of the right axle 44a and the left axle 44b, that is, the swivel shaft mechanism 34 is disposed so as to intersect the central portion CP between the right and left drive wheels 46a and 46b, a restoring torque is not generated in the direction to reverse the swivel of the drive unit 4 when the drive unit 4 is swiveled. This configuration allows improvement in the swivelability of the drive unit 4.

In addition, according to the towing device 20 of the present exemplary embodiment, with this configuration in which the drive unit 4 is disposed at a position on the rear side in the forward traveling direction of the automatic guided vehicle 1, the drive unit 4 can be disposed closer to the carriage 90. This configuration allows the length of the connecting member 24 to be shortened, thereby making it possible to achieve a compact towing device 20. As a result, the amount of lateral swinging of the carriage 90 via the connecting member 24 can be suppressed, thereby improving the steerablity of the automatic guided vehicle 1.

Figure 13:
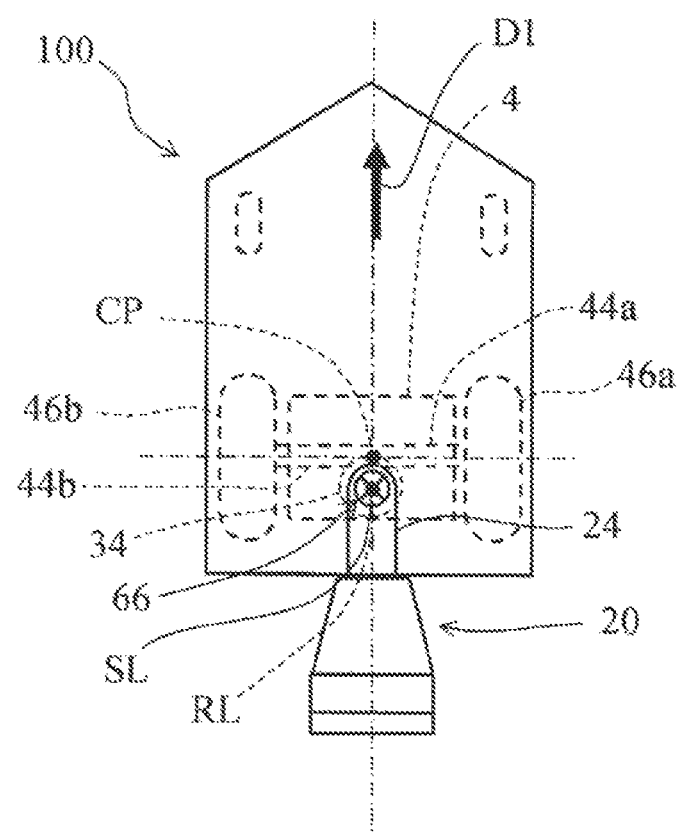
FIG. 13 is a schematic configuration diagram showing an outline of a configuration of an automatic guided vehicle 100 according to a modified example.

In this exemplary embodiment of the present advancement, the swivel shaft axis line RL intersects the intersection CP of the axis lines AL1 and AL2 of the right and left axles 44a and 44b, that is, the swivel shaft mechanism 34 is disposed so as to intersect the central portion CP between the right and left drive wheels 46a and 46b; however, the present advancement is not limited thereto. For example, as shown in an automatic guided vehicle 100 of a modified example illustrated in FIG. 13, a configuration may be adopted in which the intersection CP of the respective axis lines AL1 and AL2 of the right and left axles 44a and 44b, that is, the swivel shaft mechanism 34 may be disposed such that the swivel shaft axis line RL passes through a position offset to the rear (lower side in FIG. 13) from the center portion CP between the right and left drive wheels 46a and 46b. In this case, a restoring torque in a direction to reverse the swivel of the drive unit 4 is generated when swiveling the drive unit 4, whereby the swivelability of the drive unit 4 is reduced, but the rectilinear traveling ability can be improved.

In the present exemplary embodiment, the drive unit 4 is disposed at a position on the rear side in the forward traveling direction of the automatic guided vehicle 1; however, a configuration may be adopted in which the drive unit 4 is disposed at the front side in the forward traveling direction of the automatic guided vehicle 1.

In the present exemplary embodiment, a configuration is adopted in which the hook member 22 is connected to the other end portion of the connecting member 24 in the longitudinal direction; however, the present advancement is not limited thereto. For example, a configuration may be adopted in which the other longitudinal end portion of the connecting member 24 is bent to form the other longitudinal end portion of the connecting member 24 itself into a hook shape. Alternatively, a configuration may be adopted in which not only the hook member 22 but a pin member may be provided protruding from the other longitudinal end portion of the connecting member 24, and the pin member is hooked to the frame 92 of the carriage 90.

The present exemplary embodiment shows an example of a preferred embodiment for carrying out the present advancement. Therefore, the present advancement is not intended to be limited to the configuration of the present exemplary embodiment. Note that a description is given below of a correspondence relation between each component of the present exemplary embodiment and each component of the present advancement.

REFERENCE SIGNS LIST

1 Automatic guided vehicle (automatic guided vehicle)
2 Vehicle body (vehicle body)
2a Base portion
4 Drive unit (drive unit)
6 Front side caster (caster)
8 Battery
10 Control device
20 Towing device (towing device)
22 Hook member
24 Connecting member (connecting member)
32 Top plate
34 Swivel shaft mechanism (swivel shaft of drive wheel)
36 Swing supporting plate
36a Holder portion
38 Unit main body
42a Gear box
42b Gear box
44a right axle
44b left axle
46a Right drive wheels (drive wheel)
46b Left drive wheels (drive wheel)
48 Frame
52 Swing arm
54 Tow hook
56 Drive mechanism
62 Slide plate
64 Bearing holder
66 Swivel shaft
66a Stepped shaft portion
66a' Small diameter shaft portion
66b Flange portion
90 Carriage (carriage)
92 Frame
P Swinging pin
M1 Motor
M2 Motor
GS Guide sensor
B Ball bearing
RL Swivel shaft axis line (swivel shaft of drive wheel)
SL Swivel shaft axis line
AL1 Axis line
AL2 Axis line
D1 Traveling direction of the automatic guided vehicle
D2 Traveling direction of the carriage 90
F1 Force
F2 Force
F3 Force
Mo Rotational moment
CP Intersection of each axis line and the central portion between the left and right wheels

What is claimed is:

1. A towing device for an automatic guided vehicle capable of towing a carriage, the automatic guided vehicle having drive wheels swivelably supported on a vehicle body, the towing device comprising:
   a connecting member, one end of the connecting member connected to the automatic guided vehicle to be swivelable around a swivel shaft of the drive wheels while another end of the connecting member is connected to the carriage.

2. An automatic guided vehicle capable of towing a carriage, comprising:
   a vehicle body;
   a drive unit including drive wheels swivelably supported on the vehicle body;
   a caster disposed so as to be freely swivelable with respect to the vehicle body; and
   a towing device including a connecting member, one end of the connecting member connected to the vehicle body to be swivelable around a swivel shaft of the drive wheels while another end of the connecting member is connected to the carriage.

3. The automatic guided vehicle according to claim 2, wherein
   the swivel shaft of the drive wheels has an axis line extending in a vertical direction and also intersecting an axle of the drive wheels.

4. The automatic guided vehicle according to claim 2, wherein
   the drive wheels are disposed on a rear side of the automatic guided vehicle in a traveling direction of the automatic guided vehicle and
   the caster is disposed on a front side of the automatic guided vehicle in the traveling direction.

* * * * *